US012777339B2

(12) United States Patent
Chandrashekar et al.

(10) Patent No.: US 12,777,339 B2
(45) Date of Patent: Oct. 27, 2026

(54) METHOD TO PREDICT UNTRANSMITTED BEAMS IN AI-ML BASED BEAMFORMING

(71) Applicant: Rakuten Symphony, Inc., Tokyo (JP)

(72) Inventors: Subramanya Chandrashekar, Bangalore (IN); Raghavendra Madanahally Ramakrishna, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 268 days.

(21) Appl. No.: 18/698,101

(22) PCT Filed: Feb. 5, 2024

(86) PCT No.: PCT/US2024/014400
§ 371 (c)(1),
(2) Date: Apr. 3, 2024

(87) PCT Pub. No.: WO2025/042436
PCT Pub. Date: Feb. 27, 2025

(65) Prior Publication Data

US 2025/0240643 A1 Jul. 24, 2025

(30) Foreign Application Priority Data

Aug. 18, 2023 (IN) ............................. 202341055398
Nov. 23, 2023 (IN) ............................. 202341055398

(51) Int. Cl.
*H04W 16/22* (2009.01)
*H04W 16/28* (2009.01)
*H04W 24/06* (2009.01)

(52) U.S. Cl.
CPC .......... *H04W 16/22* (2013.01); *H04W 16/28* (2013.01); *H04W 24/06* (2013.01)

(58) Field of Classification Search
None
See application file for complete search history.

(56) References Cited

U.S. PATENT DOCUMENTS

2021/0336683 A1* 10/2021 Pezeshki ............ H04B 7/06952
2024/0039606 A1* 2/2024 Bai ...................... H04B 7/0695
(Continued)

OTHER PUBLICATIONS

Google, "On Enhancement of AI/ML based Beam Management", 3GPP TSG RAN WG1 #114, R1-2306960, Toulouse, France, Aug. 21-Aug. 25, 2023 (13 pages total).
(Continued)

*Primary Examiner* — Brian S Roberts
(74) *Attorney, Agent, or Firm* — Sughrue Mion, PLLC

(57) ABSTRACT

The subject matter relates to the wireless communication system. The subject matter discloses a method and system for predicting un-transmitted beams. The method includes determining a plurality of input parameters for a pre-trained machine learning model based on a set of transmitted beams received by a user equipment (UE) from a base station (BS). Further, the method discloses receiving association information between the set of transmitted beams and a set of un-transmitted beams, to be predicted. Finally, the method includes predicting, using the pre-trained model, beam-related information and UE location-related information associated with the set of predicted un-transmitted beams based on the plurality of input parameters and the association information. Further, the method discloses transmitting the predicted beam information to the BS, to enable the BS to serve the UE by beamforming the one of the beams from the set of predicted beams towards the UE.

17 Claims, 5 Drawing Sheets

(56) References Cited

U.S. PATENT DOCUMENTS

| | | | | |
|---|---|---|---|---|
| 2024/0056865 | A1* | 2/2024 | Sun | H04B 7/0632 |
| 2024/0057021 | A1* | 2/2024 | Pezeshki | H04W 72/046 |
| 2025/0047399 | A1* | 2/2025 | Wang | H04L 1/1829 |
| 2025/0055545 | A1* | 2/2025 | Rezaie | H04B 7/0623 |

OTHER PUBLICATIONS

Rakuten Symphony Inc., "Prediction of untransmitted beams in a UE-side AI-ML model", 3GPP TSG RAN WG1 Meeting #114, R1-2307730, Toulouse, France, Aug. 21-Aug. 25, 2023 (6 pages total).

* cited by examiner

METHOD TO PREDICT UNTRANSMITTED BEAMS IN AI-ML BASED BEAMFORMING

CROSS-REFERENCE TO RELATED APPLICATION(S)

This application is a National Stage of International Application No. PCT/US2024/014400 filed Feb. 5, 2024, claiming priority based on Indian Provisional Application No. 202341055398, filed on Aug. 18, 2023, and Indian Application No. 202341055398, filed on Nov. 23, 2023, the disclosures of which are incorporated herein in their entirety.

TECHNICAL FIELD

The present disclosure generally relates to a wireless communication system. More particularly, the present disclosure relates to prediction of un-transmitted beams in AI-ML model based beamforming.

BACKGROUND

Generally, beamforming is a technique that may be used to enhance the signal-to-noise ratio of received signals, eliminate undesirable interference sources and to focus transmitted signals to desired locations. Beamforming is the application of multiple radiating elements transmitting the same signal at an identical wavelength and phase, which combine to create a single antenna with a longer, more targeted stream which is formed by reinforcing the waves in a specific direction.

In a typical AI-ML based beam prediction procedure, at a user equipment (UE) side beam prediction is done for a set of dynamic data beams (e.g., Set A or un-transmitted beams) based on measurement results of a set of transmitted beams (e.g., Set B or static broadcast beams). For the beam prediction procedure, a base station sends reference signals (RSs) corresponding to the beams from the Set B such that the Set B may or may not be a subset of the Set A beams. The UE measures these Reference signals (RSS) i.e., measures the Set B and determines the Set A beams based on the association with the Set B beams (that is provided by Base Station). Accordingly, based on the measurement results for Set B and assistance information that may have been provided by the base station, the UE reports the best predicted beams within the Set A beams. Here, the assistance information may be required to indicate the association between Set A and Set B beams for effective and accurate beam prediction at the UE side. However, the UE may not have assistance information of set A and set B beams, when the set A beams are not beamformed earlier in the cell and there is no earlier transmission of set A beams by the base station. Thus, even if the UE predicts the set A beams and provides predicted information to the base station, the base station may not be able to identify the predicted beams and cannot perform the beamforming.

Thus, there is a need of technique to enable the identification of UE-predicted beams at the base station even when the beams have not been beamformed earlier in the cell, so that beams can be beamformed for scheduling the UE.

The information disclosed in this background of the disclosure section is only for enhancement of understanding of the general background of the invention and should not be taken as an acknowledgement or any form of suggestion that this information forms the prior art already known to a person skilled in the art.

SUMMARY

The present disclosure provides techniques to overcome the above-mentioned problem of existing technology. The embodiment of the present disclosure discloses a method for predicting un-transmitted beams. The method discloses determining a plurality of input parameters for a pre-trained machine learning model based on a set of transmitted beams received by a user equipment (UE) from a base station (BS). Further, the method discloses receiving association information from BS between the set of transmitted beams and a set of un-transmitted beams, to be predicted. The method includes predicting, using the pre-trained model, beam-related information and UE location-related information associated with the set of predicted un-transmitted beams based on the plurality of input parameters and the association information and transmit them to the BS to enable the BS to serve the UE by beamforming the one of the beams from the set of predicted beams towards the UE.

The embodiment of the present disclosure discloses an apparatus for predicting un-transmitted beams. The apparatus comprises a processor and a memory storing instructions that, when executed by the processor, configure the apparatus to determine a plurality of input parameters for a pre-trained model based on a set of statically broadcast beams received by a user equipment from a base station. Further the processor is configured to receive association information between the set of broadcast beams and a set of un-transmitted beams. Further, he processor is configured to predict, using the pre-trained model, beam-related information and UE location-related information associated with the set of un-transmitted beams based on the plurality of input parameters and the association information and transmit them to the BS to enable the BS to serve the UE by beamforming the one of the beams from the set of un-transmitted beams towards the UE.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The embodiments of the disclosure itself, as well as a preferred mode of use, further objectives, and advantages thereof, will best be understood by reference to the following detailed description of an illustrative embodiment when read in conjunction with the accompanying drawings. One or more embodiments are now described, by way of example only, with reference to the accompanying drawings in which.

Figure 1:
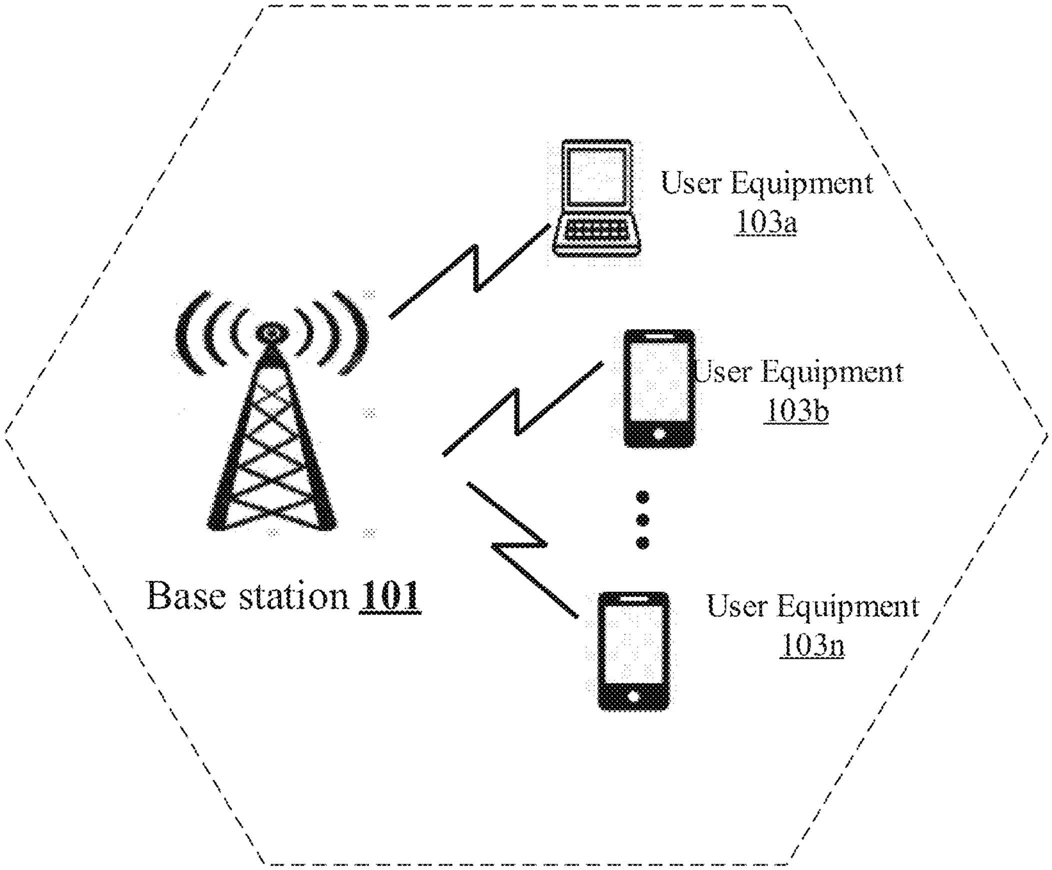
FIG. 1 illustrates a communication network that helps in predicting un-transmitted beams, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer-readable medium and executed by a computer or processor, whether or not such computer or processor is explicitly shown.

DESCRIPTION OF THE DISCLOSURE

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Generally, beam management is a process related to form a plurality of beams, control the beams in order to transmit the beam in the right direction which is towards the user equipment and also to detect the beams. In other words, beamforming is a technique that may be used to enhance the signal-to-noise ratio of received signals, eliminate undesirable interference sources and focus transmitted signals to desired locations. The technical problem that the invention tries to address is where the UE-predicted beams were never beamformed earlier in the cell, it is not feasible for a gNB or base station to relate and identify the beam and schedule the UE according to the predicted beam information. Thus, the present invention describes prediction of the un-transmitted beams by the UE and enable the base station to serve the UE by beamforming the predicted set of un-transmitted beams towards the UE.

To predict the un-transmitted beam, the present disclosure may use a pre trained machine learning model or AI/ML model which may be deployed at a user equipment (UE) side for carrying out beam prediction. In an embodiment, a base station (BS) may transmit static broadcast beams (also called as set B or transmitted beams) to the UE. Upon receiving the broadcast (set B) beams, the UE may determine the dynamic data beams (also called as set A or un-transmitted beams) based on the measurement results of the set B beams using the AI/ML model. As to accurately determine the predicted beams or un-transmitted beams, an assistance information may be required which may include the association between Set A and Set B beams. However, in certain situations, the association between the set A and the set B beams may not be available because the Set A beams may not have been beamformed earlier in the cell and there is no earlier transmission of set A beams towards the UE.

The present disclosure discloses techniques for predicting the un-transmitted beams. To predict the un-transmitted beams, the present disclosure may consider measurement results of transmitted beams (Set A or broadcast beams) and the measurement results and any required assistance information provided by BS, of the transmitted beams are fed as the input to a pre-trained machine learning model. In an embodiment, the pre-trained machine learning model may be deployed at the UE side. The base station may provide the association information to the UE. The association information indicates an association type i.e., static or dynamic association between the transmitted and un-transmitted beams. The association defines relation between the transmitted beams and un-transmitted beams which may be used for prediction of the un-transmitted beams. The measurement values of the transmitted beams and the association may be provided as input to the pre-trained model to generate an output which is prediction of the un-transmitted beams. The output of the pre-trained machine learning model may comprise the following, but not limited to, beam identifiers (ID), predicted measurement values, and Tx and/or Rx beam angles of the set of predicted un-transmitted beams. The output may also comprise additional UE location-related information such as 3 db beamwidth information, beam boresight direction, UE positioning information, azimuth and elevation angle, and beam identifiers (ID), but not limited thereto. These information may be transmitted to the base station. Based on the received information, the base station may serve the UE by beamforming the predicted set of un-transmitted beams towards the UE.

FIG. 1 illustrates a communication network where the teachings of the present disclosure may be implemented for predicting un-transmitted beams, in accordance with some embodiments of the present disclosure. The communication network 100 comprises a base station 101 and a user equipment UE 103*a* to UE 103*n* (hereinafter collectively referred as UE 103). The UE 103 may be any one of following, but not limited to, a smart phone, a laptop, a tablet phone, a personal computer, a desktop and the like. The present disclosure relates to beam prediction procedure that predicts the un-transmitted beams and allow beamforming of the un-transmitted beams towards the UE 103. To predict the un-transmitted beam, the present disclosure may use the pre-trained machine learning model (not shown in FIG. 1). An AI/ML model (which is interchangeably used as pre-trained machine learning model) may be deployed at the UE side. In an alternative embodiment, the training of AI/ML model may be performed at the base station 101 side. In another embodiment, a paired AI/ML Model(s) over which joint inference is performed, where joint inference comprises AI/ML inference whose inference is performed jointly across the UE 103 and the base station 101, i.e., the first part of inference is firstly performed by UE 103 and then the remaining part is performed by base station 101, or vice versa. For ease of understanding, consider the AI/ML model to be present at the UE 103 side but not limited thereto. In the present invention, a plurality of input parameters for a pre-trained machine learning model is determined based on a set of transmitted beams received by UE 103 from the base station 101. In other words, an input parameter for instance, measurement values of the set of transmitted beams, assistance information, carrier-to-interference ratio (CIR) based on the set of transmitted beams, and beam identifiers (ID) may be fed as the input to a pre-trained machine learning model. The input parameter is determined by performing measurements on the set of transmitted beams (broadcast beams or reference signals transmitted from the base station 101 to the UE 103). Further, the UE 103 may also obtain assistance information between the set of transmitted beams and a set of un-transmitted beams from the base station 101 to further predict the un-transmitted beams. The assistance information may indicate the association between the transmitted and un-transmitted beams for effective and accurate prediction of the UE 103. The assistance information is an important parameter for pre-trained machine learning model to generate the output which may be used to predict the un-transmitted beam and inform the base station 101. The prediction by the pre-trained model may comprise beam-related information and the UE 103 location-related information. The prediction may be performed based on the plurality of input parameters and the association information to enable the BS to serve the UE by beamforming the set of predicted beams towards the UE 103. In an embodiment, the association information may not be available between the transmitted beams and to be predicted un-transmitted beam. In such a scenario, the pre-trained model may consider the association as “dynamic”. When the association is indicated as “dynamic”, the pre-trained model may generate UE 103 related information in addition to the beam-related information to assist the base station 101 to perform beamforming of the predicted un-transmitted beams towards the UE 103. In an embodiment, The beam-related information may comprise beam identifiers (ID), predicted measurement values, and Tx and/or Rx beam angles of the set of predicted un-transmitted beams, but not limited thereto. Further, the UE location-related information may comprise one or more of: 3 db beamwidth information, beam boresight direction, UE positioning information, azimuth and elevation angle, and beam identifiers (ID), but not limited thereto. Further, the beam-related information and the UE location-related information associated with the set of predicted un-transmitted beams is transmitted to the base station 101 to enable the base station 101 to serve the UE by beamforming the predicted set of un-transmitted beams towards the UE 103.

Figure 2A:
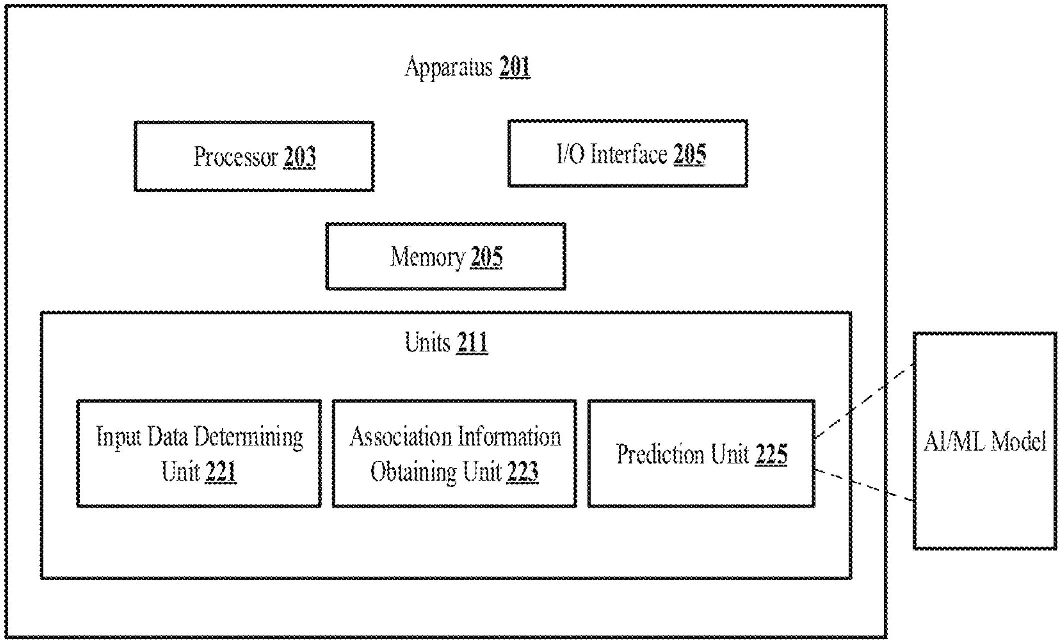
FIG. 2A illustrates a block diagram of an apparatus for predicting un-transmitted beams, in accordance with some embodiments of the present disclosure.

FIG. 2A illustrates a block diagram of an apparatus 201 for predicting un-transmitted beams, in accordance with some embodiments of the present disclosure. The apparatus 201 may comprise a processor 203, I/O interface 205 and the memory 207, various units 211, but not limited thereto. In an embodiment, the units 211 may be communicatively coupled to the processor 203. As used herein, the term units refer to an application specific integrated circuit (ASIC), an electronic circuit, a processor 203 (shared, dedicated, or group) and memory 207 that execute one or more software or firmware programs, a combinational logic circuit, and/or other suitable components that provide the described functionality. In some embodiments, the units 211 may include, for example, an input data determining unit 221, an association information obtaining unit 223, a prediction unit 225. The prediction unit 225 may comprise an AI/ML model (i.e., pre-trained model) which may be used to predict the un-transmitted beams.

In an embodiment, the UE 103 may not have any association information regarding the transmitted or set A beams (broadcast beams) as it is not always feasible to transmit the set A beams from the base station 101 to the UE just for the training purposes. Another factor may be that data beams are not static in nature and not 1:1 mapped to the broadcast beams (CSI-RS/SSB etc). Hence, it is infeasible for the network to have transmitted all the “to be predicted” un-transmitted or data beams in advance. Thus, the output of AI/ML model may not be sufficient for the base station 101 to perform the beamforming of the predicted un-transmitted beams. Therefore, there is a need for sending the additional information describing the positional information of the UE 103 to the base station 101 based on which the base station 101 may serve the UE by beamforming the set of predicted beams towards the UE 103.

Figure 2B:
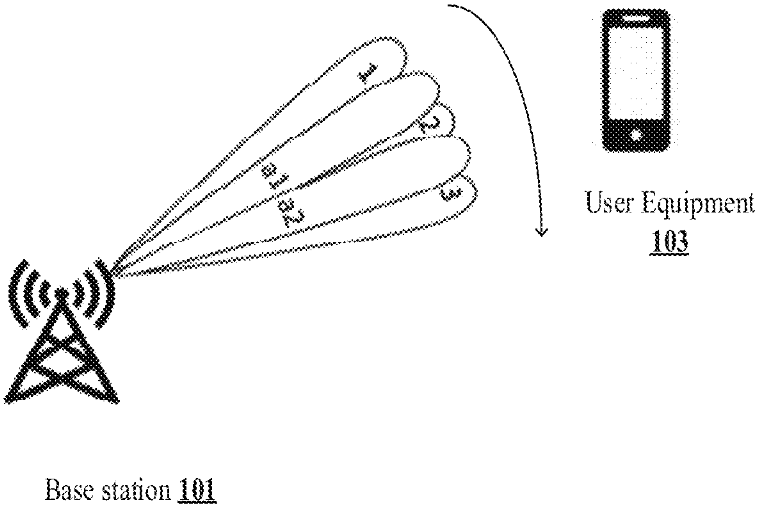
FIG. 2B illustrates exemplary embodiment for predicting un-transmitted beams, in accordance with some embodiments of the present disclosure.

Thus, the processor 203 may initially determine the input data 213 that may correspond to the plurality of input parameters for the pre-trained machine learning model (AI/ML model) based on a set of transmitted beams (Set B). The processor 203 or the input data determining unit 221 may determine a plurality of input parameters for the pre-trained machine learning model based on the set of transmitted beams received by the UE from the base station 101. For ease of understanding, in the UE 103, the AI/ML model may be deployed as shown in FIG. 2B, which may be used for the beam prediction by considering the measurement results of the transmitted beams. Based on the transmitted beam or a reference signal that may be received from the base station 101, the processor 203 may measure the reference signals i.e., measures the transmitted beams. The plurality of input parameters are determined by performing measurements on the set of transmitted beams. The plurality of input parameters comprises at least one of: measurement values of the set of transmitted beams, assistance information provided by BS, carrier-to-interference ratio (CIR) based on the set of transmitted beams, and beam identifiers (ID).

Thereafter, the processor 203 or the association information obtaining unit 223 may obtain the association information between the un-transmitted beams and the transmitted beams from the base station. The assistance information may indicate the association between un-transmitted beams and the transmitted beam for effective and accurate prediction by processor. When there is no association between the transmitted and to be predicted un-transmitted beams, the association information may indicate a dynamic association between the set of un-transmitted beams and the set of transmitted beams. Thus, without assistance information, it is almost impossible to ensure that the model output is decoded accurately at the base station 101.

Further, the processor 203 or the prediction module comprising the AI/ML model or pretrained machine learning model may predict beam-related information and UE location-related information associated with the set of predicted un-transmitted beams based on the plurality of input parameters and the association information. Particularly, the beam-related information such as beam identifiers (ID), predicted measurement values, and Tx and/or Rx beam angles of the set of predicted un-transmitted beams and the UE location-related information such as 3 db beamwidth information, beam boresight direction, UE positioning information, azimuth and elevation angle, and beam identifiers (ID) associated with the set of predicted un-transmitted beams are predicted based on the plurality of input parameters and the association information. This way, the processor 203 may send the beam-related information and the UE location-related information associated with the set of predicted un-transmitted beams to the base station 101 for enabling the base station to serve the UE by beamforming the predicted set of un-transmitted beams towards the UE 103. Based on received information from the UE 103, the base station may transmit the un-transmitted beams towards the UE 103. The UE location-related information may also be predicted as there is no prior connection between the base station 101 and the UE 103, it is important for the base station 101 to understand the precise position of the UE so that the base station 101 may serve the UE 103 by beamforming the set of predicted beams towards the UE 103.

For ease of understanding, the pre-trained machine learning model is trained by using training data associated with a cell being served by the base station 101. The training data may be obtained by the UE 103 upon entering into the cell. Further, the input for the pre-trained machine learning model may be the measurement results of the transmitted beams (set B). The measurement results of the transmitted beams may be measurement of the set of transmitted beams, assistance information, carrier-to-interference ratio based on the set of transmitted beams, and beam identifiers. When the measurement values of the transmitted beams are given as the input to the pre-trained machine learning mode, the pre-trained machine learning model may provide the output such as beam identifiers, predicted measurement values, and Tx and/or Rx beam angles of the set of predicted un-transmitted beams. Further, the processor 203 may use the association information between the transmitted and un-transmitted beams which is obtained from the base station 101 to further the predict the un-transmitted beams. The output of the pre-trained machine learning model i.e., beam identifiers (ID), predicted measurement values, and Tx and/or Rx beam angles of the set of predicted un-transmitted beams along with the UE location-related information such as 3 db beamwidth information, beam boresight direction, UE positioning information, azimuth and elevation angle, and beam identifiers (ID) may be transmitted to the base station 101. Thus, the base station 101 may use beam-related information and the UE location-related information associated with the set of predicted un-transmitted beams to serve the UE by beamforming the set of predicted beams towards the UE 103.

For example, consider, beams of transmitted beams as set B (1,2,3) and un-transmitted beams as set A (a1, a2). Specifically, a1 and a2 are assumed to have not been transmitted for given UE in the cell. The dynamic association between Set A and Set B is obtained from the base station 101 and shared with the UE 103, using which the processor 203 may detect beams a1 and a2 as part of Set A, which the processor 203 may predict beam-related information and the UE location-related information associated with the set of predicted un-transmitted beams based on the plurality of input parameters and the association information using the AI/ML model. The processor 203 predicts a1 and/or a2 as the best beams using its AI-ML beam prediction algorithm and transmit the beam-related information and the UE location-related information associated with the set of predicted un-transmitted beams to the BS for enabling the BS to serve the UE 103 by beamforming the predicted set of un-transmitted beams towards the UE 103 as shown in FIG. 2B.

For beam management, the base station 101 has been configured to transmit two different set of beams i.e., data beams (set A) and broadcast beams (set B). In one scenario, the two sets of beams may be transmitted in the spatial domain. In an embodiment, the set A beams may be different from the set B beams (i.e., set B beams are not subset of set A beams). In another embodiment, the set B beams may be a subset of set A beams. The following are selected as representative sub use-cases. According to this case: the input for AI/ML model may be: Alt 1): Only L1-RSRP measurement based on Set B; Alt.2): L1-RSRP measurement based on Set B and assistance information; Alt. 3): CIR based on Set B; Alt. 4): L1-RSRP measurement based on Set B and the corresponding DL Tx and/or Rx beam ID.

Further, the present disclosure discloses temporal downlink beam prediction for Set A of beams based on the historic measurement results of Set B of beams. In this scenario, the two sets of beams may be transmitted in the temporal domain. In an embodiment, the set A beams and set B beams may be different (i.e., set B beams are not subset of set A beams). In another embodiment, the set B beams may be a subset of set A beams (i.e., set A and set B beams are not same). In yet another embodiment, the set A beams may be same as that of set B beams. For temporal downlink beam prediction, the AI/ML model may receive input such as measurement results of K (K≥1) latest measurement instances such as only L1-RSRP measurement based on Set B, L1-RSRP measurement based on Set B and assistance information and L1-RSRP measurement based on Set B and the corresponding DL Tx and/or Rx beam ID. The AI/ML model output: may be F predictions for F future time instances, where each prediction is for each time instance. At least F=1

From the above, Set B is a set of beams whose measurements are taken as inputs of the AI/ML model. However, beams in Set A and Set B can be in the same frequency range. In both the cases, DL Tx beam prediction, DL Rx beam prediction (deprioritized), beam pair prediction (a beam pair consists of a DL Tx beam and a corresponding DL Rx beam) may be used for predicted beams.

In the present disclosure, the training of AI/ML model may be of different types.

Type 1: Joint training of the two-sided model at a single side/entity, e.g., UE-sided or base station-sided. Here, the assistance information may be provided to the entity where joint-training is performed.

Type 2: Joint training of the two-sided model at network side and UE side, respectively.

Type 3: Separate training at bases station side and UE side, where the UE-side CSI generation part and the network-side CSI reconstruction part are trained by UE side and network side, respectively.

In the present disclosure, the joint training means the generation model and reconstruction model should be trained in the same loop for forward propagation and backward propagation. The joint training could be done both at single node or across multiple nodes (e.g., through gradient exchange between nodes). A separate training includes sequential training starting with UE side training, or sequential training starting with NW side training at the UE and network.

Figure 3:
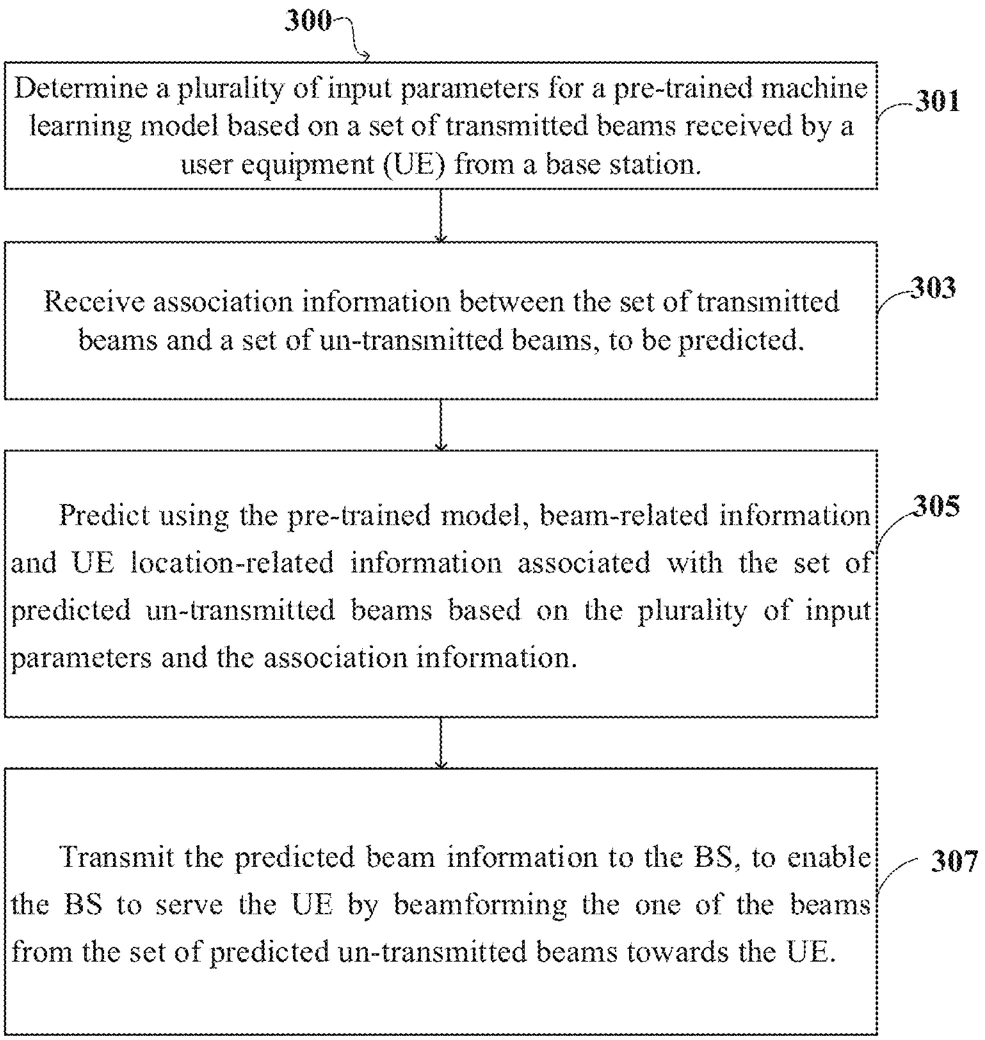
FIG. 3 illustrates a flow chart for predicting un-transmitted beams, in accordance with some embodiments of the present disclosure.

FIG. 3 shows a flowchart illustrates a flow chart for predicting un-transmitted beams, in accordance with some embodiments of the present disclosure;

As illustrated in FIG. 3, the method 300 includes one or more blocks illustrating a method of predicting un-transmitted beams. The method 300 may be described in the general context of computer executable instructions. Generally, computer executable instructions can include routines, programs, objects, components, procedures, units, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include determining a plurality of input parameters for a pre-trained machine learning model based on a set of transmitted beams received by a user equipment (UE) from a base station. The parameters are determined by performing measurements on the set of transmitted beams. The input parameters comprises at least one of: measurement values of the set of transmitted beams, assistance information, carrier-to-interference ratio (CIR) based on the set of transmitted beams, and beam identifiers (ID).

At block 303, the method 300 may include obtaining, by the UE, association information between the set of transmitted beams and a set of un-transmitted beams, to be predicted. The association information indicates a dynamic association between the set of un-transmitted beams and the set of transmitted beams.

At block 305, the method 300 may include predicting, using the pre-trained model, beam-related information and UE location-related information associated with the set of predicted un-transmitted beams based on the plurality of input parameters and the association information to enable the BS to serve the UE by beamforming the set of predicted beams towards the UE. The beam-related information comprises beam identifiers (ID), predicted measurement values, and Tx and/or Rx beam angles of the set of predicted un-transmitted beams. Further, UE location-related information comprises one or more of: 3 db beamwidth information, beam boresight direction, UE positioning information, azimuth and elevation angle, and beam identifiers (ID).

At block 307, the method 300 may transmit the predicted beam information to the BS for enabling the BS to serve the UE by beamforming the one of the beams from the set of un-transmitted beams towards the UE.

Figure 4:
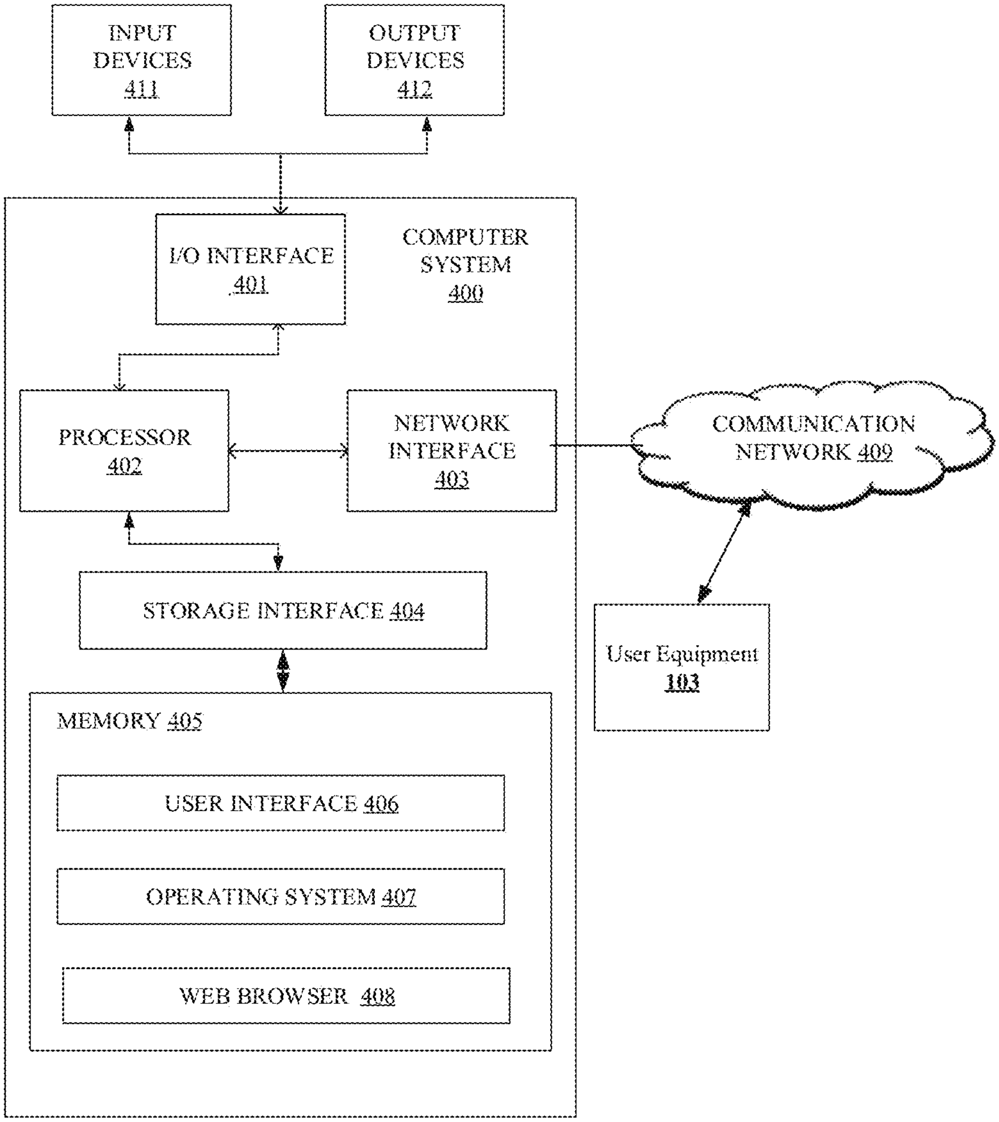
FIG. 4 is a block diagram of an exemplary computer system for implementing embodiments consistent with the present disclosure.

In some embodiments, FIG. 4 illustrates a block diagram of an exemplary computing system 400 for implementing embodiments consistent with the present invention. In some embodiments, the computing system 400 may predict un-transmitted beams. The computer system 400 may include a central processing unit ("CPU" or "processor 107") 402. The processor 402 may include at least one data processor 402 for executing program components for executing user processes. A user 103 may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc. Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more sensors 105, and grinder 103. The communication network 409 can be implemented as one of the different types of networks, such as intranet or Local Area Network (LAN), Closed Area Network (CAN) and such within the vehicle. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more computing devices 103 may include, but not limited to, a mobile phone, a tablet phone, a laptop and the like. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor 402 may be stored. Thus, a computer-readable storage medium may store instructions for execution by one or more processor 402, including instructions for causing the processor 402 to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise. A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:

determining a plurality of input parameters for a pre-trained machine learning model based on a set of transmitted beams received by a user equipment (UE) from a base station (BS);

receiving, at the UE, association information between the set of transmitted beams and a set of un-transmitted beams, to be predicted; and predicting, using the pre-trained machine learning model, beam-related information and UE location-related information associated with the set of un-transmitted beams based on the plurality of input parameters and the association information; and transmitting the predicted beam-related information to the BS, to enable the BS to serve the UE by beamforming one of beams from the set of un-transmitted beams towards the UE.

2. The method of claim 1, further comprising:

wherein transmitting the predicted beam-related information involves sending the beam-related information and the UE location-related information associated with the set of predicted un-transmitted beams to the BS for enabling the BS to serve the UE by beamforming one of the predicted set of un-transmitted beams towards the UE.

3. The method of claim 1, wherein the plurality of input parameters are determined by performing measurements on the set of transmitted beams, and wherein the plurality of input parameters comprises at least one of: measurement values of the set of transmitted beams, assistance information provided by the BS, carrier-to-interference ratio (CIR) based on the set of transmitted beams, and beam identifiers (ID).

4. The method of claim 1, wherein the UE location-related information comprises one or more of: 3 db beamwidth information, beam boresight direction, UE positioning information, azimuth and elevation angle, and beam identifiers (ID).

5. The method of claim 1, wherein the beam-related information comprises beam identifiers (ID), predicted measurement values, and Tx and/or Rx beam angles of the set of predicted un-transmitted beams.

6. The method of claim 1, wherein the set of transmitted or the set of un-transmitted beams are user-specific dynamic data beams or static broadcast beams.

7. The method of claim 1, wherein association information indicates a dynamic association between the set of un-transmitted beams and the set of transmitted beams.

8. The method of claim 1, wherein the pre-trained machine learning model is stored on the UE, and wherein the pre-trained model is trained by the UE using training data associated with a cell being served by the BS, wherein the training data is obtained by the UE upon entering into the cell.

9. An apparatus comprising:

a processor configured to:

determine a plurality of input parameters for a pre-trained machine learning model based on a set of transmitted beams received by a user equipment (UE) from a base station (BS);

receive association information between the set of transmitted beams and a set of un-transmitted beams, to be predicted; and predict using the pre-trained machine learning model, beam-related information and UE location-related information associated with the set of un-transmitted beams based on the plurality of input parameters and the association information; and transmit the predicted beam-related information to the BS, to enable the BS to serve the UE by beamforming the one of the beams from the set of un-transmitted beams towards the UE.

10. The apparatus of claim 9, wherein the apparatus is configured to:

transmit the predicted beam-related information by sending the beam-related information and the UE location-related information associated with the set of predicted un-transmitted beams to the BS for enabling the BS to serve the UE by beamforming one of the predicted set of un-transmitted beams towards the UE.

11. The apparatus of claim 9, wherein the plurality of input parameters are determined by performing measurements on the set of transmitted beams, and wherein the plurality of input parameters comprises at least one of: measurement values of the set of transmitted beams, assistance information provided by the BS, carrier-to-interference ratio (CIR) based on the set of transmitted beams, and beam identifiers (ID).

12. The apparatus of claim 9, wherein the UE location-related information comprises one or more of: 3 db beamwidth information, beam boresight direction, UE position information, azimuth and elevation angle, and beam identifiers (ID).

13. The apparatus of claim 9, wherein the beam-related information comprises beam identifiers (ID), predicted measurement values, and Tx and/or Rx beam angles of the set of un-transmitted beams.

14. The apparatus of claim 9, wherein the set of transmitted or the set of un-transmitted beams are user-specific dynamic data beams or static broadcast beams.

15. The apparatus of claim 9, wherein association information indicates a dynamic association between the set of un-transmitted beams and the set of transmitted beams.

16. The apparatus of claim 9, wherein the pre-trained machine learning model is stored on the UE, and wherein the pre-trained model is trained by the UE using train data associated with a cell being served by the BS, wherein the training data is obtained by the UE upon entering into the cell.

17. A non-transitory computer-readable storage medium, the non-transitory computer-readable storage medium including instructions that when executed by a computer, cause the computer to:

determine a plurality of input parameters for a pre-trained machine learning model based on a set of transmitted beams received by a user equipment (UE) from a base station (BS);

receive association information between the set of transmitted beams and a set of un-transmitted beams, to be predicted; and predict using the pre-trained machine learning model, beam-related information and UE location-related information associated with the set of un-transmitted beams based on the plurality of input parameters and the association information; and transmit the predicted beam-related information to the BS, to enable the BS to serve the UE by beamforming one of beams from the set of un-transmitted beams towards the UE.

* * * * *